Oct. 20, 1964 F. C. DE BOLT ET AL 3,153,733
SEQUENTIAL KEYER
Filed June 15, 1962 2 Sheets-Sheet 1
FIG. 1
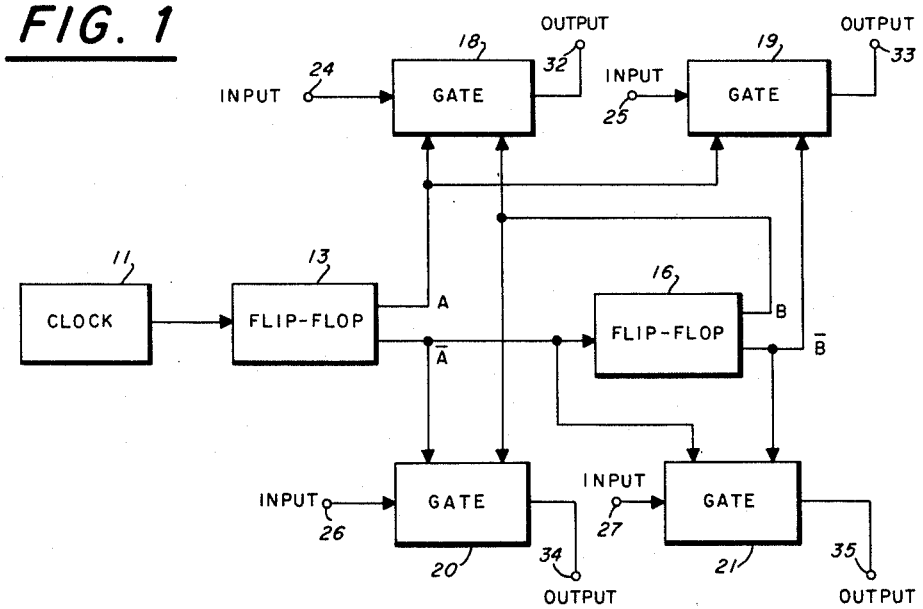
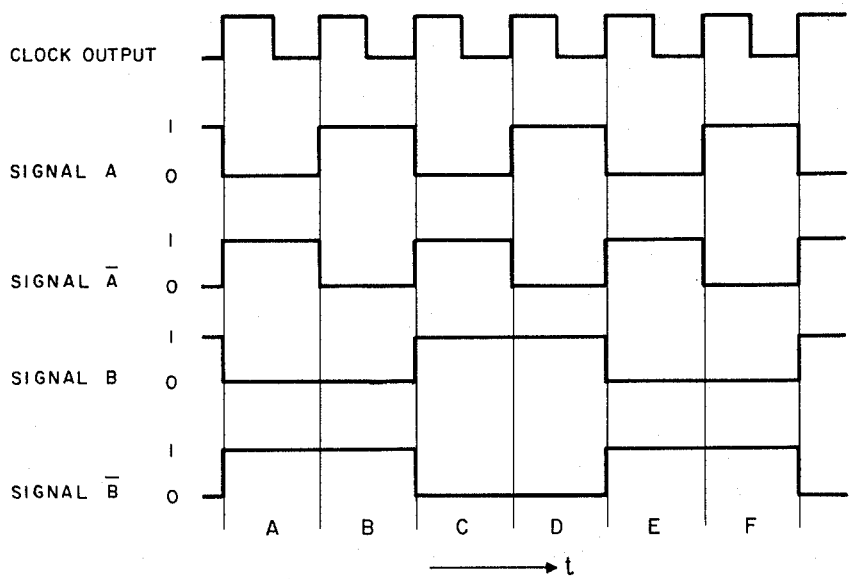
FIG. 3
INVENTORS
FRANK C. DE BOLT
RICHARD A. HILLS
BY
ATTORNEYS Oct. 20, 1964  F. C. DE BOLT ET AL  3,153,733
SEQUENTIAL KEYER Filed June 15, 1962  2 Sheets-Sheet 2

INVENTORS
FRANK C. DeBOLT
RICHARD A. HILLS
BY
ATTORNEYS 3,153,733
Patented Oct. 20, 1964

3,153,733
SEQUENTIAL KEYER
Frank C. De Bolt, Corpus Christi, Tex., and Richard A. Hills, La Jolla, Calif., assignors to the United States of America as represented by the Secretary of the Navy
Filed June 15, 1962, Ser. No. 202,925
3 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

The present invention pertains to a keying system and more particularly an electronic system for sequentially keying audio signals.

In accordance with conventional sequential keyers, a motor-driven rotary switch is employed to alternately switch signals. The motor-driven switch method has the disadvantages of large size, heavy weight, and large power consumption. The apparatus generates objectionable audible and R-F noise and the switch contacts wear rapidly. If the motor speed is controllable at all, it is usually controllable over a very limited range.

It is an object of the present invention to provide an electronic sequential keyer that has no moving parts and obviates all the shortcomings of the above-mentioned apparatus.

It is an object of the invention to provide a compact, light-weight sequential keyer that has low power consumption.

It is an object of the present invention to provide a stable keyer with an adjustable keying rate that is adjustable over a wide range.

It is an advantage of the invention that it produces no audible or R-F noise.

Other objects and advantages of the invention will be apparent from a study of the following specifications, read in connection with the accompanying drawings, wherein:

FIG. 1 is a block diagram of the general form of a sequential keyer circuit employing the invention;

FIG. 3 illustrates waveforms of keying signals in the operation of the apparatus of FIG. 2.

Figure 2:
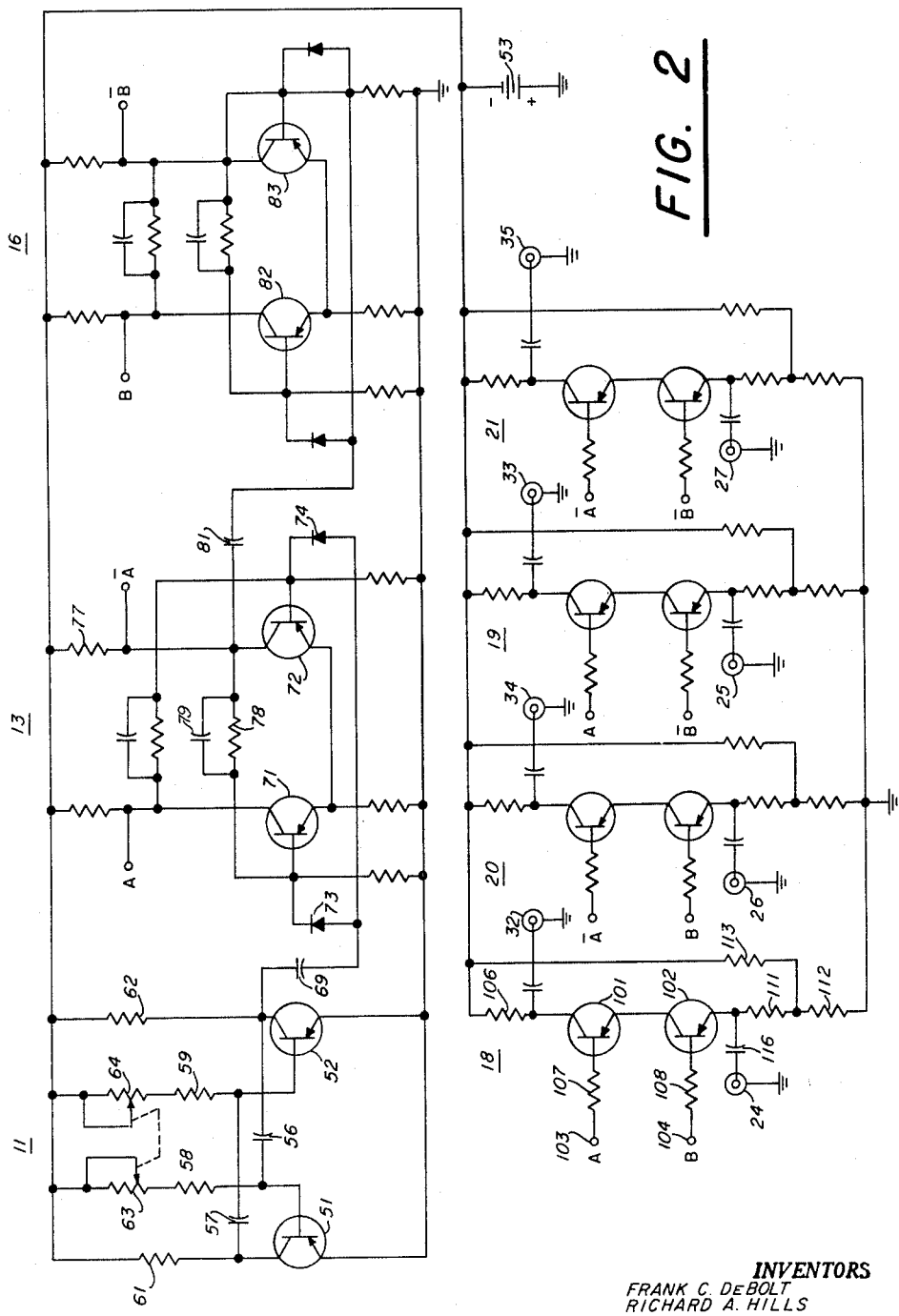
FIG. 2 shows schematically a sequential keyer in accordance with the invention.

Referring to FIG. 1, clock 11 emits pulses at a repetition rate that may be varied. Clock 11 may be, for example, a free-running multivibrator. The output of clock 11 is connected to the input of flip-flop 13. A flip-flop is a device having two stable states. It remains in one state until switched or toggled by an external stimulus. The output signal of a flip-flop occupies one of two levels at any given time. For convenience herein, the levels will be designated 0 and 1. The output signals of flip-flop 13 are A and the inverse of A, $\bar{A}$. That is, when signal A is at the 1 level, $\bar{A}$ is at the 0 level and conversely. Flip-flop 13 is cascaded to flip-flop 16 which generates output signals B and $\bar{B}$. Individually the flip-flops function as single-stage binary counters. In their cascaded form they function as a scale-of-four counter. Thus, for every four pulses entering flip-flop 13 from clock 11, only one pulse of the same polarity is emitted at an output of flip-flop 16.

Gates 18–21 are coincident gates having audio signal input terminals 24–27, respectively, and audio output terminals 32–35, respectively. Each gate has two switch inputs and each input is coupled to one output of one of the flip-flops. Thus, signals A and B are fed to the switch inputs of gate 18, respectively, signals A and $\bar{B}$ are fed fed to the switch inputs of gate 19, respectively, and so forth.

The coincidence gates pass an audio signal from input terminal to output terminal when, and as long as, both signals at the switch inputs occupy the same level, for example, the 0 level. At a given time, 0 level signals appear at both switch inputs of only one gate. As soon as one of the flip-flops switches state, 0 level signals appear at the switch inputs of another gate and that gate only. As flip-flops 13 and 16 continue to switch states, the switch inputs of alternate gates are simultaneously energized with 0 level signals. As a net result, gates 18–21 are alternately turned on and off at a rate established by the clock and the audio signals impressed on inputs 24–27 alternately appear at the outputs of their respective gates.

FIG. 2 illustrates schematically an exemplary sequential keyer circuit in accordance with the invention. PNP transistors 51 and 52 are interconnected to form an astable multivibrator. The bias voltages for these and the remaining transistors are supplied by D.-C. power supply 53. If when energized, transistor 51 conducts more heavily than transistor 52 because of imbalance in the components, the voltage drop across resistor 61 increases and the base of transistor 52 sees a positive-going voltage because of capacitor 57. Capacitor 57 begins to discharge through resistor 59 and potentiometer 64, and capacitor 56 begins to charge through resistor 62. Capacitor 57 discharges toward ground potential with a time constant determined by the resistance of resistor 59 and potentiometer 64. When the voltage across capacitor 57 becomes zero transistor 52 begins to conduct. The positive-going voltage at the collector of transistor 52 is transferred to the base of transistor 51 causing the conduction in transistor 51 to decrease and finally stop. Transistor 51 then remains "off" until capacitor 56 discharges through resistor 58 and potentiometer 63. When the voltage across capacitor 56 is zero, transistor 51 again conducts and the cycle repeats.

Transistors 71 and 72 are interconnected as a bistable multivibrator employing positive-pulse steering. The output voltage from multivibrator 11 is A.-C. coupled through capacitor 69 to pulse steering diodes 73 and 74. The cathodes of diodes 73 and 74 are connected to the bases of transistors 71 and 72, respectively. Positive-going pulses from multivibrator 11 causes transistors 71 and 72 to alternately turn off.

Assuming when flip-flop 13 is energized that transistor 72 conducts more heavily than transistor 71, the increasing voltage drop across the collector resistor 77 is coupled to the base of transistor 71. This reduces the forward bias and conduction in transistor 71 begins to decrease. The regenerative feedback continues until transistor 71 is cut-off and transistor 72 is saturated. Under these conditions the base of transistor 71 is near ground potential and the base of transistor 72 is more negative. Thus, when a positive-going pulse is applied through coupling capacitor 69 from multivibrator 11, diode 74 conducts and a positive-going pulse is applied to the base of transistor 72. This pulse is sufficient to cut-off transistor 72. As transistor 72 cuts off, a negative-going voltage pulse is coupled to the base of transistor 71 via capacitor 79 and resistor 78 causing transistor 71 to saturate.

When transistor 71 is saturated and transistor 72 is cut-off, the base voltage of transistor 71 is more negative than the base voltage of transistor 72. When the next positive-going pulse is applied through capacitor 69, pulse steering diode 73 conducts and the positive-going pulse is applied to the base of transistor 71, causing it to cut off. And so the transistors continue to alternately conduct as positive-going pulses are applied to diodes 73 and 74.

Output signals A and $\bar{A}$ are produced at the collectors of transistors 71 and 72, respectively. Signal A assumes one level when transistor 71 is conducting and assumes a second level when the transistor is cut-off. Signal $\overline{A}$ assumes two levels as transistor 72 switches on and off. As transistor 71 conducts when transistor 72 is cut-off, and vice versa, the level assumed by signal $\overline{A}$ is always the complement of the level assumed by signal A. If the levels are designated 0 and 1, then signal $\overline{A}$ is at the 0 level when A is at the 1 level and vice versa.

Transistors 82 and 83 are interconnected as a bistable multivibrator 16 with positive pulse steering. Multivibrators (flip-flops) 13 and 16 are identical in circuitry and operation. Output signals B and $\overline{B}$ are generated at the collectors of transistors 82 and 83, respectively. Multivibrator 16 is cascaded to multivibrator 13 by means of coupling capacitor 81.

For every two positive-going pulses applied to capacitor 69 from clock 11, one positive-going pulse appears at the collector of transistor 72. Similarly, for every two positive-going pulse applied to capacitor 81 from multivibrator 13, one positive-going pulse appears at the collector of transistor 83. Thus, for every four positive pulses applied to capacitor 69, only one positive-going pulse appears at the collector of transistor 83 and the two multivibrators function as a scale-of-four counter.

In operation, when negative-going signals are applied to inputs 103 and 104 simultaneously from flip-flops 13 and 16, respectively, the base-emitter reverse bias of both transistors is overcome causing both transistors to conduct and the audio signal impressed on input terminal 24 to be transmitted to the output terminal 32. However, when the signal at either input terminal is positive-going, the gate switches off and the audio signal is discontinued at output terminal 32.

Gates 19–21 have a circuit configuration identical to that of gate 18. The switching or keying signals applied to gate 20 are $\overline{A}$ and B. Keying signals A and $\overline{B}$ are applied to gate 19, whereas signals $\overline{A}$ and $\overline{B}$ are applied to gate 21 from flip-flops 13 and 16. Three audio signals are applied to input terminals 25, 26 and 27, respectively. The bias voltages for all of the gates are provided by power supply 53.

As flip-flops 13 and 16 switch states of operation at a rate controlled by clock 11, gates 18–21 alternately switch on and the audio signal that is associated with the "on" gate appears at the output terminal of that gate. When the flip-flops toggle as shown in FIG. 3, the four gates are switched on in the following sequence: 18, 19, 20, 21. It is apparent from these waveforms that the "on" periods (periods A, B, C, etc.) of each gate are equal. As stated above, these periods may be varied by adjusting ganged potentiometers 63 and 64 in clock 11.

Obviously many modifications and variations of the present invention are possible in the light of the above teachings. It is therefore to be understood that within the scope of the appended claims the invention may be practiced otherwise than as specifically described.

What is claimed is:

1. A sequential keyer for alternately keying first, second, third and fourth audio signals comprising a counter having an input and four outputs, a clock having an output connected to the input of said counter, first, second, third and fourth gates, each gate having a first switch line, a second switch line, an audio input and an audio output, each of said gates comprising first and second semiconductors each having a base electrode, a collector electrode and an emitter electrode, said collector electrode of said second semiconductor being connected to said emitter of said first semiconductor, a power supply having first and second terminals, a first resistor connected between said first terminal of said power supply and the collector electrode of said first semiconductor, second and third resistors, said resistors being connected in series and connected between said emitter electrode of said second semiconductor and said second terminal of said power supply, a fourth resistor connected between said junction of said second and third resistors and said first terminal of said power supply, a fifth resistor connected between said first switch line and said base electrode of said first semiconductor, a sixth resistor connected between said second switch line and said base electrode of said second semiconductor, a first capacitor connected between said audio input and said emitter of said second semiconductor, a second capacitor connected between said collector electrode of said first semiconductor and said audio output, said audio inputs of said first, second, third and fourth gates being adapted to receive said first, second, third and fourth audio signals, respectively, each of said outputs of said counter being connected to two switch lines and each of said switch lines being connected to only one output of said counter, said counter alternately turning on said gages so that said audio signals alternately appear at said audio outputs.

2. A sequential keyer for alternately switching first, second, third and fourth audio signals comprising a rate multivibrator having an output, a scale-of-four counter having an input and four outputs, the signals produced at said outputs being binary signals A, $\overline{A}$, B and $\overline{B}$, means for coupling the output of said multivibrator to said input of said counter, first, second, third and fourth coincident gates, each of said gates having first and second switch lines, an audio input and an audio output, means for coupling output signals A and B to said first and second switch lines of said first gate, respectively, means for coupling said output signals A and $\overline{B}$ to said first and second switch lines of said second gate, respectively, means for coupling said output signals $\overline{A}$ and B to said first and second switch lines of said third gate, respectively, means for coupling said output signals $\overline{A}$ and $\overline{B}$ to said first and second switch lines of said fourth gate, respectively, said audio inputs of said first, second, third and fourth gates being adapted to receive said first, second, third and fourth audio signals, respectively, said output signals A, $\overline{A}$, B and $\overline{B}$ alternately turning on said gates so that said first, second, third and fourth audio signals alternately appear at said audio outputs of said first, second, third and fourth gates, respectively.

3. Apparatus in accordance with claim 2 wherein said gates each comprise two interconnected active semiconductors, said semiconductors both remaining cut off until said first and second switch lines are simultaneously energized by identical binary signals.

References Cited in the file of this patent
UNITED STATES PATENTS

| 2,670,445 | Felker | Feb. 23, 1954 |
| 3,071,699 | Eckl et al. | Jan. 1, 1963 |
| 3,100,294 | Dryden | Aug. 6, 1963 |